United States Patent [19]
Bauman et al.

[11] 3,781,691
[45] Dec. 25, 1973

[54] PULSE REPETITION FREQUENCY FILTER CIRCUIT

[75] Inventors: Weldon W. Bauman, Sunnyvale; Edward Collins, IV, San Jose, both of Calif.

[73] Assignee: Itek Corporation, Lexington, Mass.

[22] Filed: May 1, 1972

[21] Appl. No.: 248,909

[52] U.S. Cl. .................. 328/109, 328/56
[51] Int. Cl. .................. H03k 5/20
[58] Field of Search .................. 328/110, 109, 56; 307/232, 234, 218

[56] References Cited

UNITED STATES PATENTS

| | | | |
|---|---|---|---|
| 3,305,785 | 2/1967 | Carroll, Jr. | 328/110 X |
| 3,502,991 | 3/1970 | Sampson | 328/56 |
| 3,518,555 | 6/1970 | Konotchiek, Jr. | 328/110 |
| 3,588,707 | 6/1971 | Manship | 328/110 |

*Primary Examiner*—John W. Huckert
*Assistant Examiner*—B. P. Davis
*Attorney*—Homer O. Blair et al.

[57] ABSTRACT

A pulse repetition frequency (PRF) filter circuit wherein the pulse repetition interval (PRI) between previously received pulses is utilized to gate a currently received pulse. In one embodiment the PRI between first and second received pulses of a pulse train is utilized to gate a third and currently received pulse in that pulse train. The first pulse, after being delayed for a period of time equal to twice the pulse repetition time (PRT) of a pulse train having one highest PRF within the bandpass of the filter circuit, enables the sequential generation of a first series of n gating signals. The second pulse, after being delayed for a period of time equal to half the time delay of the first pulse, enables the sequential generation of a second series of *n*/2 gating signals. A series of AND gates are enabled in sequence by the first and second series of gating signals, with each AND gate in the series being enabled in sequence by one gating signal of the second series of gating signals and any one of three gating signals of the first series of gating signals. The circuit is designed such that the simultaneous enabling of an AND gate by a gating signal from the first series and a gating signal from the second series defines the PRI between the first and second received pulses. This defined PRI is then utilized to generate a narrow gating window for a third pulse in the pulse train at the determined PRI after the second pulse.

20 Claims, 3 Drawing Figures

PULSE REPETITION FREQUENCY FILTER CIRCUIT

BACKGROUND OF THE INVENTION

The present invention relates generally to filter circuits for filtering pulse trains having PRFs within a given bandwidth, and more particularly pertains to a new and improved PRF filter circuit which is capable of filtering pulse trains over a wide bandwidth, and which is highly selective in gating pulses through the filter circuit.

In the filed of PRF filter circuits, it has been the general practice to utilize a circuit which develops a wide, fixed window gating signal a given amount of time after the receipt of a first pulse. The window gating signal determines the bandwidth of the filter circuit, and gates all pulses received within the window gating signal. A disadvantage of such a circuit is that many extraneous pulses are passed through the wide window gating signal. These extraneous pulses present an unsatisfactory level of pulse noise at the output of the filter circuit.

An example of such a fixed window prior art gating circuit is shown in U.S. Pat. No. 3,518,555 to Konotchick, Jr., issued June 30, 1970. The present invention represents an improvement over Konotchick, Jr. in that this invention has a narrower accept bandwidth than Konotchick, Jr. with resultant improved noise rejection. One reason for this narrower accept bandwidth is the different manners in which input pulses are inserted into the two circuits. In Konotchick, Jr. the monostable multivibrator illustrated at the input to the filter circuit is required to ensure 100 percent pulse entry into the filter circuit when narrow width input pulses are anticipated. To ensure 100 percent pulse entry with narrow width input pulses the time duration of the monostable multivibrator must be slightly longer than the clock pulses utilized to step the delay lines. With the longer time duration of the multivibrator it is possible for a pulse inserted into the delay lines of Konotchick, Jr. to be up to one complete clock cycle out of phase with the pulse received by the multivibrator. Since the multivibrator loads each of the several delay line shift registers, the monostable multivibrator introduces up to one bit ambiguity during each loading of all the delay lines, resulting in an ambiguity which is cumulative in proportion to the number of delay lines utilized.

In the present invention, a timer quantizer circuit is utilized to ensure pulse insertion into the filter circuit. Like Konotchick, Jr., the time quantizer circuit may introduce up to one bit ambiguity in the filter circuit. However, unlike Konotchick, Jr. the time quantizer circuit only loads one delay line instead of several delay lines. Thus, although one bit ambiguity may be introduced by the time quantizer circuit the ambiguity is not cumulative in proportion to the number of delay lines utilized, as in Konotchick, Jr.

SUMMARY OF THE INVENTION

In accordance with a preferred embodiment, a pulse repetition frequency (PRF) filter circuit is disclosed which is capable of filtering pulse trains over a relatively wide bandwidth, and which utilizes the determined PRI between previously received pulses in the pulse train to generate a gating signal for the next pulse in the pulse train. The generation of a gating signal based upon the PRI between previously received pulses greatly reduces the probability of passing extraneous pulses. Further, the preferred embodiment may be time shared between different pulse trains within the bandwidth of the filter circuit, and can simultaneously filter many pulse trains at one time. Also, the preferred embodiment is so designed that the filtering operation of one pulse train does not interfere with the filtering operation of another pulse train.

Further, the preferred embodiment provides a system for precisely measuring the interval between two input signals. Although the preferred embodiment is described in context with a PRF filter circuit, the teachings of this invention on precision measurements of the interval between two input signals have wide applicability beyond the PRF filter art.

DESCRIPTION OF A PREFERRED EMBODIMENT

Figure 1:
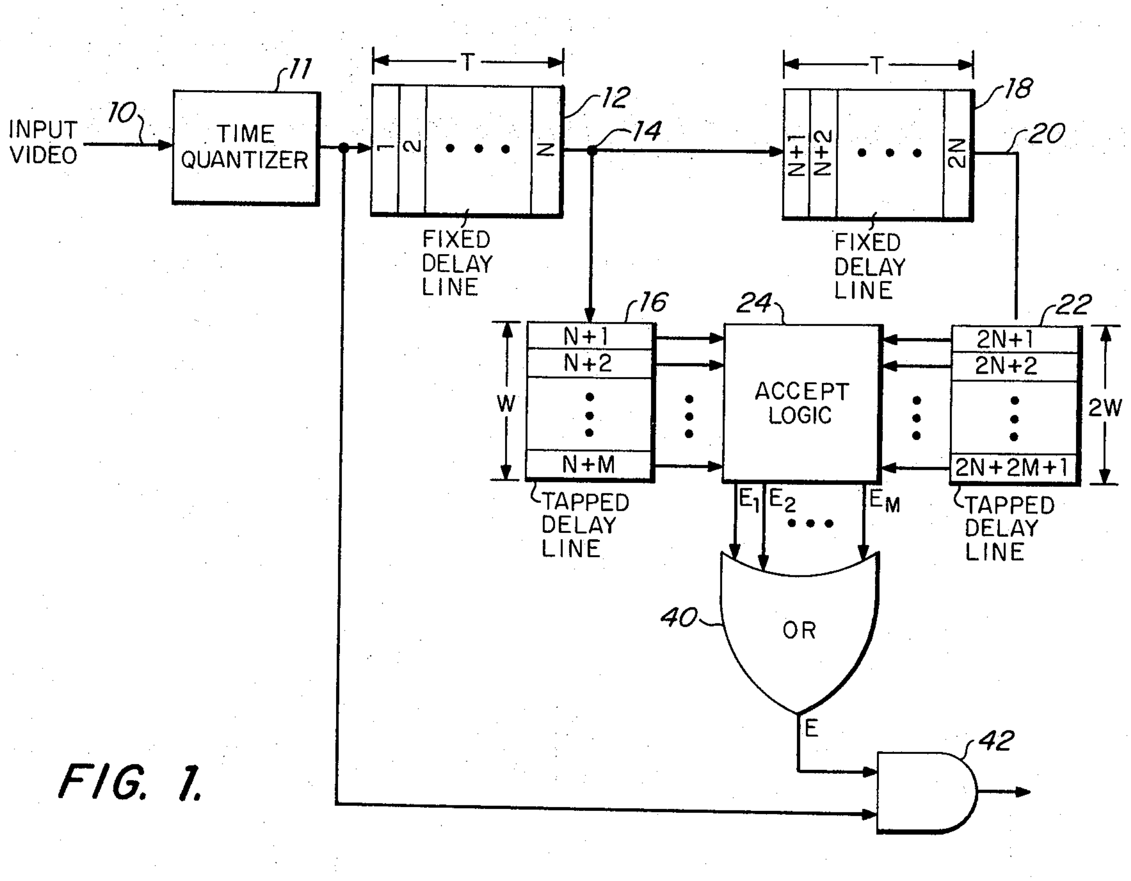
FIG. 1 is a block diagram of a PRF filter circuit wherein the PRI between first and second received pulses is utilized to generate a gating signal for a third pulse.

FIG. 1 is a block diagram of a PRF filter circuit wherein the PRI between first and second received pulses is utilized to generate a gating signal for a third pulse. Input video to be filtered enters the circuit on line 10 into a time quantizer circuit which asynchronously inserts pulses into the circuit. A time quantizer circuit divides time into successive intervals of a fixed duration, and generates a logic one during an interval if during the previous interval either the leading or trailing edge of an input video pulse was received. Otherwise, the output is zero. Alternatively, the input video on line 10 may be directly received pulses have not been processed in a time quantizer circuit.

Assume for the purpose of explanation that a single pulse train, which lies within the bandwidth of the filter circuit, is an input on line 10. The first pulse in the pulse train is shifted by a fixed delay line 12, which may be a digital delay line consisting of N flip-flop circuits driven by a clock generator, to point 14 in the circuit. The first pulse is then further delayed by a second fixed delay line 18, which may also consist of N flip-flop circuits driven by the same clock generator, before arriving at point 20 in the circuit. In other embodiments fixed delay lines 12 and 18 might be other types of art known delay means such as shift registers, driven commutators, or sonic delay lines. Delay lines 12 and 18 each delay the pulse for N counts of the clock which each total a time period T equal to the PRT of the pulse train having the highest PRF within the bandwidth of the filter circuit. By the time the first pulse has been delayed for 2N counts of the clock for a time period 2T by the first and second delay lines and has arrived at point 20, a second pulse in the pulse train has been delayed for N counts of the clock for a time period T, and has been shifted by the first delay line 12 to point 14, and a third pulse is about to enter the circuit on input line 10. The first pulse, upon reaching point 20 in the circuit, enters a tapped delay line 22 having 2M+1 stages and 2M+1 output taps. The tapped delay line may be a tapped shift register driven by the same clock used to drive fixed delay lines 12 and 18, and accordingly a pulse shifted to the end of tapped delay line 22 would be delayed by it for 2M+1 counts of the clock for a period of time designated 2W. The second pulse, upon reaching point 14 of the circuit, enters tapped delay line 16. Tapped delay line 16 may also be a tapped shift register driven by the same clock utilized to drive delay lines 12, 18 and 22. Tapped delay line 16 has M stages, and accordingly a pulse shifted to the end of tapped delay line 16 would be delayed for M counts of the clock for a period of time designated W. The number of tapped stages in delay line 22 is twice plus one the number of stages in delay line 16 for a reason which will be explained later.

Figure 2:
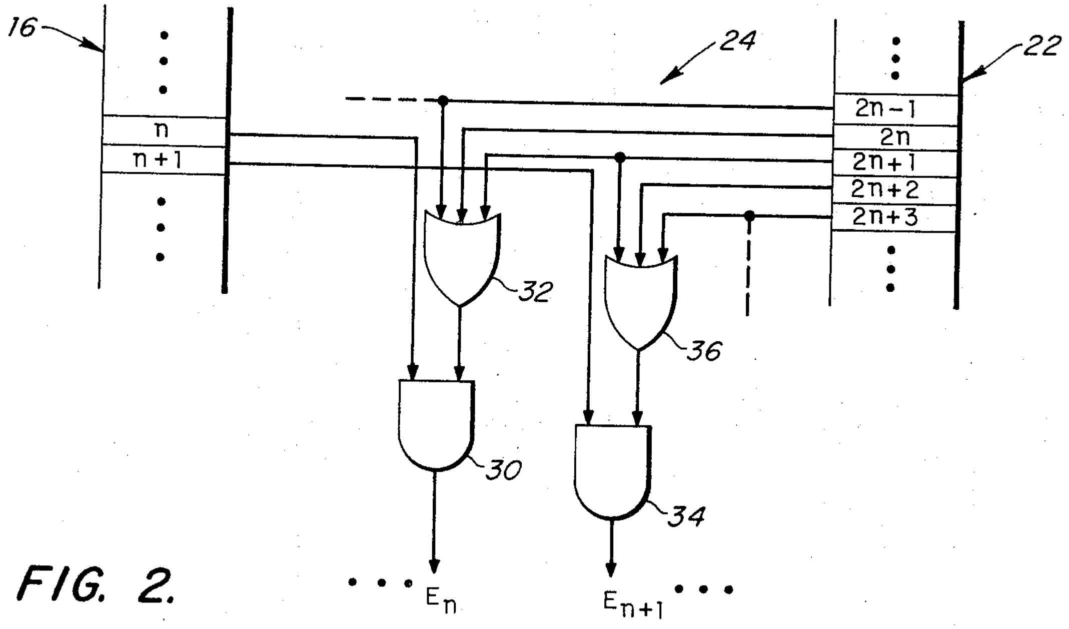
FIG. 2 is a logic diagram of the ACCEPT logic circuit illustrated in block form in FIG. 1.

The ACCEPT logic circuit 24 is more fully explained by the block diagram of FIG. 2. ACCEPT logic circuit 24 includes M AND gates, one for each stage of tapped delay line 16. Two AND gates 30 and 34 are illustrated for the n and n+1 (where n is any given number) stages of the tapped delay line 16. AND gate 30 is enabled by tap n of delay line 16 and any of three taps (2–1, 2n, and 2n+1) of delay line 22. The three taps of the delay line 22 include a middle tap 2n plus the tap immediately preceeding the middle tap (2n–1) and the tap immediately following the middle tap (2n+1), all of which enable OR gate 32 which in turn enables AND gate 30. AND gate 30 produces an output signal $E_n$ if it simultaneously receives an enabling signal from the n tap of delay line 16 and an enabling signal from any of the 2n–1, 2n or 2n+1 taps of delay line 22. Likewise, ANd gate 34 produces an output signal En+1 if AND simultaneously receives an enabling signal from the n+1 tap of delay line 16 and any of taps 2n+1, 2n+2, or 2n+3 of delay line 22. In a like manner each of the M AND gates in the ACCEPT logic circuit produces an output signal if it is enabled by one tap from delay line 16 and any of three taps from delay line 22. Every other tap of delay line 22 is a middle tap for an AND gate in the ACCEPT logic.

The function of the ACCEPT logic will now be explained. The first pulse, upon reaching point 20 in the circuit, enters tapped delay line 22 and is stepped down the delay line for a period of time 2W. The second pulse, upon reaching point 14 in the circuit, enters tapped delay line 16 and is stepped down tapped delay line 16 for a period of time W. The first pulse slowly enables in sequence each of the AND gates in the ACCEPT logic over the period of time 2W. While the first pulse enables each AND gate in sequence over the time period 2W, the second pulse enables each AND gate in a much more rapid fashion over the time period W. If the pulse train is within the bandwidth of the PRF filter circuit, then at some time while the first pulse is being slowly stepped down the 2W delay line, the second pulse being rapidly stepped down the W delay line line will overtake the AND gates being enabled by the first pulse, and at least one AND gate will be enabled simultaneously by the first and second pulses. The simultaneous enabling of that AND gate defines the PRI between the first and second pulses. If the pulse train has a high PRF (and conversely a low PRI) within the bandwidth of the filter circuit, then the second pulse stepped down the W delay line will overtake the first pulse and both pulses will simultaneously enable one of the early AND gates in the ACCEPT logic circuit. Likewise, if the pulse train has a low PRF (and conversely a high PRI) within the bandwidth of the filter circuit, then the second pulse will overtake the first pulse and both pulses will simultaneously enable one of the later AND gates of the ACCEPT logic circuit 24. The simultaneous enabling of an AND gate in the ACCEPT logic circuit 24 enables OR gate 40 which has its input all of the AND gates, which in turn enables AND gate 42. AND gate 42 generates a narrow gating window which is utilized to gate the third and undelayed pulse on line 10 through the filter circuit.

One reason for enabling AND gate 30 by any of three taps from the 2W window is to allow a pulse train to be passed by the filter circuit in spite of a slight amount of jitter in the pulse train or any slight retardation or advancement of the pulses in the circuitry. Such retardation or advancement might occur in the digital delay lines or during the asynchronous pulse insertion which occurs if a time quantizer circuit is used at the input.

Figure 3:
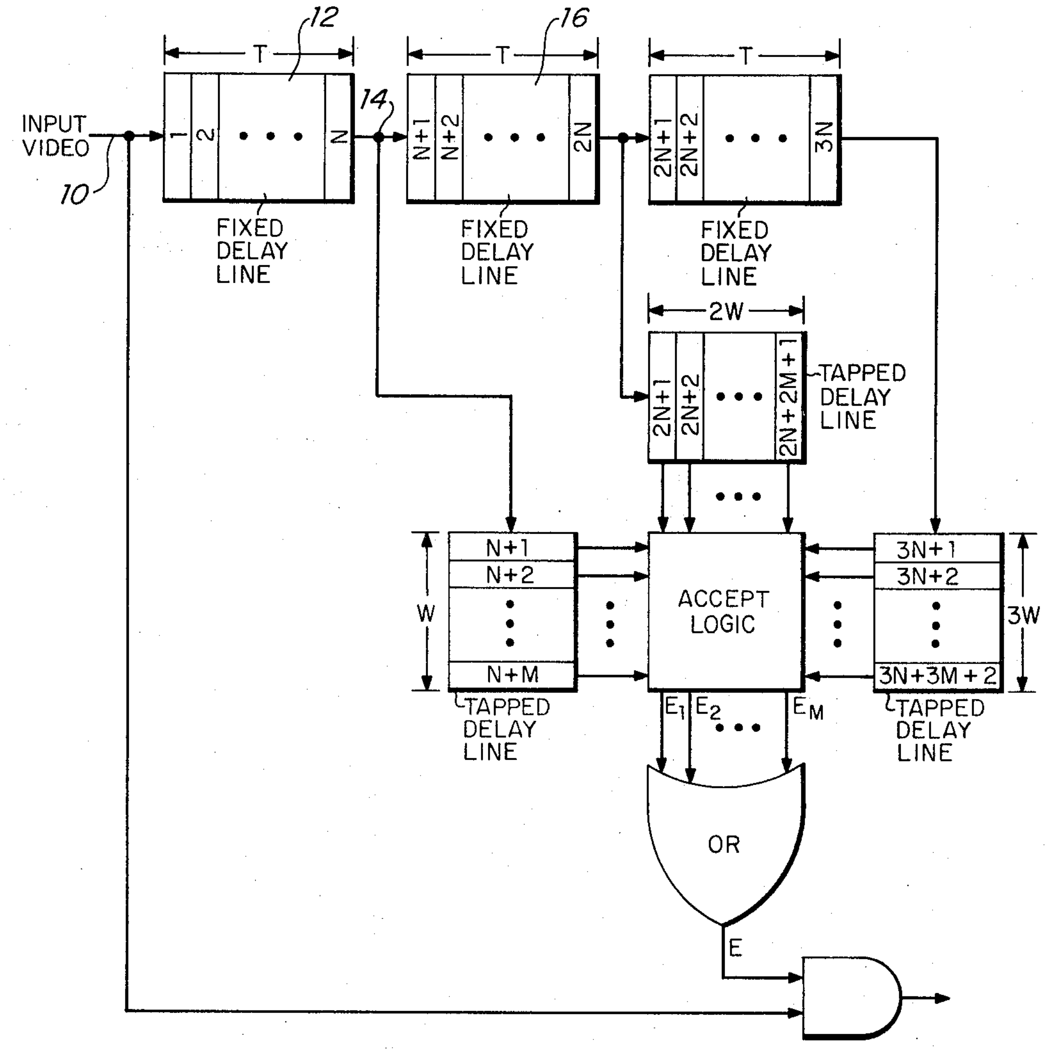
FIG. 3 is a block diagram of a PRF filter circuit wherein the PRI between first and second received pulses and the PRI between second and third received pulses are utilized to generate a gating signal for a fourth pulse.

FIG. 3 illustrates an embodiment of the invention which utilizes the PRI between the first and second pulses, and the PRI between the second and third pulses to generate a gating signal for the fourth pulse. The circuit is substantially the same as the circuit illustrated in FIG. 1, except that the ACCEPT logic circuit for the circuit of FIG. 3 would have three enabling signals for each AND gate. Each AND gate would be enabled by one signal from the W delay line, any of three signals from the 2W delay line, and any of five signals from the 3W delay line. The embodiment illustrated in FIG. 3 presents a stricter criteria for acceptance of a currently received pulse than does the embodiment illustrated in FIG. 1. In the embodiment of FIG. 3, the PRIs between the first and second, second and third, and third and fourth pulses must all lie within a narrow range for the currently received fourth pulse to be gated. In a manner as illustrated in FIG. 3 a circuit could be designed to gate a currently received pulse on the basis of any number of previous PRIs.

It should be noted that the preferred embodiment is capable of simultaneously handling many different pulse trains, each of which are within the bandwidth of the filter circuit. As the pulses in one pulse train are being stepped down each of the delay lines, the pulses of another train would be stepped down other steps in each delay line. If two pulses from separate pulse trains are occupying the same step of each delay line, then the step would simultaneously perform a filtering action for each of the pulse trains. It may be readily seen that the filtering action of one pulse train does not in any way interfere with the filtering action of another pulse train.

While several embodiments of the invention have been described, the teachings of this invention will suggest many other embodiments to those skilled in the art.

I claim:

1. A system for producing an indication of the timing interval between first and second signals applied thereto and comprising:

a. a first tapped delay means having a first number of taps and responsive to said first signal for transporting the first signal down the first tapped delay means;

b. a second tapped delay means having a second number of taps, said second number being a different number than said first number, and responsive to said second signal for transporting the second signal down the second tapped delay means; and c. a logic circuit including, a plurality of gating circuits, means for coupling each gating circuit to a number of taps from said first tapped delay means and a different number of taps from said second tapped delay means to allow the plurality of gating circuits to be enabled in sequence by signals being transported down said first and second tapped delay means, and each gating circuit producing an output signal upon its simultaneous enablement by said first and second tapped delay means, said output signal being indicative of the timing interval between said first and second signals.

2. A system as set forth in claim 1 wherein:

a. said second number of taps in said second tap delay means is a lesser number than said first number of taps in said first tapped delay means; and b. said logic circuit includes means for coupling each gating circuit to a number of taps from said first tapped delay means and a lesser number of taps from said second tapped delay means.

3. A system as set forth in claim 2 wherein:

a. said plurality of gating circuits includes one gating circuit for each tap of said second tapped delay means; and b. said logic circuit includes means for connecting each gating circuit to an associated one tap of said second tapped delay means.

4. A system as set forth in claim 3 wherein said logic circuit includes means for connecting each gating circuit to three taps of said first tapped delay means.

5. The system as set forth in claim 1 wherein said first and second signals are pulses, and the system includes apparatus for gating a pulse train having said first and second signals as component pulses thereof and comprising:

a. an input means for receiving input pulses;

b. a third delay means, interposed between said input means and said first tapped delay means, for delaying said first pulse for a first given period of time after receipt by said input means before direting the first pulse to said first tapped delay means;

c. a fourth delay means, interposed between said input means and said second tapped delay means, for delaying the second pulse for a second given period of time after receipt by said input means before directing the second pulse to said second tapped delay means; and d. each gating circuit including means for developing a gating signal upon the simultaneous enabling of the gating circuit by said first and second tapped delay means.

6. Apparatus as set forth in claim 5 wherein said fourth delay means includes means for delaying the second pulse for a second period of time which is half as long as said first period of time.

7. Apparatus as set forth in claim 6 wherein said third delay means and said fourth delay means include a common delay line, means for coupling said first tapped delay means to receive the first pulse at the end of the common delay line, and means for connecting said second tapped delay to receive the second pulse from the middle of the common delay line.

8. Apparatus as set forth in claim 5 wherein:

a. said second number of taps in said second tapped delay means is a lesser number of taps than said first number of taps in said first tapped delay means; and b. said logic circuit includes means for coupling each gating circuit to a number of taps from said first tapped delay means and a lesser number of taps from said second tap delay means.

9. Apparatus as set forth in claim 8 wherein:

a. said plurality of gating circuits includes one gating circuit for each tap of said second tapped delay means; and b. said logic circuit includes means for connecting each gating circuit to an associated one tap of said second tapped delay means.

10. Apparatus as set forth in claim 9 wherein said logic circuit includes means for connecting each gating circuit to three taps of said first tapped delay means.

11. Apparatus as set forth in claim 9 wherein said fourth delay means includes means for delaying the second pulse for a second period of time which is half as long as said first period of time.

12. Apparatus as set forth in claim 11 wherein said third delay means and said fourth delay means include a common delay line, means for coupling said first tapped delay means to receive the first pulse at the end of the common delay line, and means for connecting said second tapped delay to receive the second pulse from the middle of the common delay line.

13. Apparatus as set forth in claim 12 wherein said logic circuit includes means for connecting each gating circuit to three taps of said first tapped delay means.

14. A system for producing an indication of the timing interval between first and second input signals received at an input terminal of the system and comprising:

a. a plurality of timing coincidence circuits each having a first and second input terminal and an output terminal for producing an output signal indicative of the simultaneous application of input signals to each of said input terminals;

b. first timing means responsive to the receipt of said first input pulse for sequentially applying evenly spaced timing signals at a first predetermined rate to said first input terminals of said coincidence circuits to enable them at a first predetermined rate; and c. second timing means responsive to the receipt of a second input signal for sequentially applying evenly spaced timing signals at a second predetermined rate, faster than said first predetermined rate, to said second input terminals of said coincidence circuits to enable them at a second and faster predetermined rate, whereby said second input terminals will be enabled at a faster rate than said first input terminals and when the first and second input terminals of a particular coincidence circuit are simultaneously enabled the output signal from that particular coincidence circuit will define the time interval between said first and second input pulses.

15. Apparatus as set forth in claim 14 and further including:

a. an additional coincidence circuit having first and second input terminals;

b. an OR circuit coupled between the output terminals of said timing coincidence circuits and said first input terminal of said additional coincidence circuit; and c. means for coupling the second input terminal of said additional coincidence circuit to said input terminal of the system.

16. Apparatus for gating a pulse train having first, second and third pulses as components thereof and comprising:

a. an input means for receiving input pulses;

b. a first tapped delay means having a first number of taps and responsive to said first pulse for transporting the first pulse down the first tapped delay means;

c. a second tapped delay means having a second number of taps, less than said first number, and responsive to said second pulse for transporting the second down the second tapped delay means;

d. a third tapped delay means having a third number of taps, less than said second number, and responsive to said third pulse for transporting the third pulse down the third tapped delay means;

e. a fourth delay means, interposed between said input means and said first tapped delay means, for delaying said first pulse for a first given period of time after receipt by said input means before directing the first pulse to said first tapped delay means;

f. a fifth delay means, interposed between said input means and said second tapped delay means, for delaying the second pulse for a second given period of time after receipt by said input means before directing the second pulse to said second tapped delay means;

g. a sixth delay means, interposed between said input means and said third tapped delay means, for delaying the third pulse for a third given period of time after receipt by said input means before directing the third pulse to said third tapped delay means; and h. a logic circuit including a plurality of gating circuits connected to said first, second and third tapped delay means to be enabled in sequence by pulses being transported down said first, second and third tapped delay means, means for connecting each gating circuit to a first number of adjacent taps from said first tapped delay means, means for connecting each gating circuit to a lesser number of adjacent taps from said second tapped delay means, and means for connecting each gating circuit to a still lesser number of taps from said third tapped delay means, and each gating circuit including means for developing a gating signal upon the simultaneous enabling of the gating signal by said first, second and third tapped delay means.

17. Apparatus as set forth in claim 16 wherein:

a. said plurality of gating circuits includes one gating circuit for each tap of said third tapped delay means; and b. said logic circuit includes means for connecting each gating circuit to one tap of said third tapped delay means.

18. Apparatus as set forth in claim 17 wherein said logic circuit includes:

a. means for connecting each gating circuit to three taps from said second tapped delay means; and b. means for connecting each gating circuit to five taps from said first tapped delay means.

19. Apparatus as set forth in claim 17 wherein:

a. said means for delaying the second pulse for a second period of time includes means for delaying the second pulse for a period of time which is two-thirds as long as said first period of time; and b. said means for delaying the third pulse for a third period of time includes means for delaying the third pulse for a period of time which is one third as long as first period of time.

20. Apparatus as set forth in claim 19 wherein said fourth delay means, said fifth delay means and said sixth delay means include a common delay line, means for connecting said first tapped delay means to receive the first pulse at the end of the common delay line, means for connecting said second tapped delay means to receive the second pulse from a position two thirds of the way down the common delay line, and means for connecting said third tapped delay means to receive the third pulse from a position one-third the way down the common delay line.

* * * * *